(12) United States Patent
Reichard

(10) Patent No.: US 7,275,907 B1
(45) Date of Patent: Oct. 2, 2007

(54) BOAT TRAILER TUG

(76) Inventor: Donald Reichard, 1665 Highway 24, Stockton, KS (US) 67669

( * ) Notice: Subject to any disclaimer, the term of this patent is extended or adjusted under 35 U.S.C. 154(b) by 478 days.

(21) Appl. No.: 10/765,480

(22) Filed: Jan. 27, 2004

(51) Int. Cl.
*B62B 1/00* (2006.01)

(52) U.S. Cl. ............... 414/476; 414/471; 414/483; 280/414.1; 180/11; 180/13; 180/14.2; 180/15; 114/344; 440/36

(58) Field of Classification Search ............ 414/563, 414/471, 476, 483; 280/414.1; 440/12.69, 440/36; 114/344; 180/11, 12, 13, 14.2, 15, 180/16
See application file for complete search history.

(56) References Cited

U.S. PATENT DOCUMENTS

| | | | |
|---|---|---|---|
| 3,158,881 A | | 12/1964 | Clausen |
| 3,568,624 A | * | 3/1971 | Bjorklund ............... 440/12.69 |
| 3,817,401 A | * | 6/1974 | Becker .................... 414/12 |
| 4,266,796 A | | 5/1981 | Riggs et al. |
| 4,417,841 A | * | 11/1983 | Chadwick ............... 414/346 |
| 4,448,274 A | * | 5/1984 | van der Lely ........... 180/15 |
| 4,538,952 A | * | 9/1985 | Chase .................... 414/458 |
| 4,586,725 A | * | 5/1986 | Jeanson ................. 280/414.1 |
| 4,915,577 A | * | 4/1990 | Fraser ................... 414/476 |
| 5,282,515 A | * | 2/1994 | Bell ....................... 180/11 |
| 5,295,703 A | | 3/1994 | White |
| 5,857,823 A | | 1/1999 | MacEachern |
| 6,079,729 A | | 6/2000 | Braun |
| 6,341,793 B2 | | 1/2002 | Braun |
| 6,575,487 B1 | * | 6/2003 | Krause ................... 280/414.1 |

FOREIGN PATENT DOCUMENTS

EP 0 278 943 A2 2/1988

\* cited by examiner

*Primary Examiner*—David H. Bollinger
*Assistant Examiner*—M S Lowe
(74) *Attorney, Agent, or Firm*—Farris Law, P.C.; Robert L. Farris

(57) ABSTRACT

The boat trailer tug includes a primary frame with a mounting beam that is attachable to a boat trailer frame. A primary collar is fixed to the mounting beam front end. A hitch tongue is connected to the collar and extends forward from the collar. A hitch ball receiver is mounted on a front end of the hitch tongue for connecting the tug to a towing vehicle. A vertical height adjustment frame is slidably connected to the collar. A linear actuator moves the height adjustment frame up and down relative to the collar. A power unit frame is pivotally attached to the height adjustment frame for pivotal movement about a vertical axis. A motor, transmission and driven wheels are mounted on the power unit frame. The linear actuator raises and lowers the driven wheels. A steering system pivots the power unit frame to steer the tug.

3 Claims, 5 Drawing Sheets

BOAT TRAILER TUG

FIELD OF THE INVENTION

The boat trailer tug is a power unit, attached to the primary hitch assembly of a boat trailer, that is elevated out of ground engagement when the trailer is attached to a vehicle by a secondary hitch, and that is lowered into ground engagement to move the trailer and a boat into and out of water to launch or retrieve the boat.

BACKGROUND OF THE INVENTION

The small boats are transported on trailers pulled on public roads by vehicles. These vehicles include family sedans, sports utility vehicles of various sizes, pickups of various sizes and motor homes. In areas where a vehicle can pull two trailers, a boat trailer can be pulled behind a trailer house or camper trailer.

Access to rivers and lakes, for small boats, is provided by boat launching ramps. These ramps are usually an inclined concrete slab that extends down into the water. Similar boat launching ramps are also available for launching boats in the ocean.

A boat is launched from a trailer on a launch ramp by moving the trailer down the ramp backwards until the trailer is partially submerged and the boat floats in the water. The trailer axle or axles are submerged and the tires and wheels are at least partially submerged. The rear tires and wheels of a vehicle attached to a boat trailer can be starting into the water by the time the trailer is in the water a sufficient distance to float a boat carried by the trailer. Many boat owners are hesitant to back their vehicles down an inclined ramp until a boat on their trailer floats. A motor home that is pulling a boat trailer may have a rear portion of the vehicle in the water by the time a boat on the trailer will float.

Boat trailers are moved into water nearly the same distance to retrieve a boat as they are moved into the water to launch a boat. A vehicle on an inclined ramp may accidentally move down a boat launch ramp further than intended. Vehicles that move too far down an inclined ramp may have wet brakes. Water can also enter gear cases. Water in gear cases such as axle housings must be removed to prevent damage to the vehicle.

Some boat owners pull their boat on a trailer pulled by a motor home as stated above. After the boat is in the water, the motor home is parked in a suitable area and leveled by jacks so that the floor is horizontal and the vehicle does not rock on its suspension system. Leveling will take a little time. Once the motor home is level, the motor home is not available to take the boat out of the water, or for transportation.

SUMMARY OF THE INVENTION

The boat trailer tug includes a primary collar. A mounting beam is fixed to the primary collar, extends to the rear of the primary collar and is connectable to a boat trailer. A hitch tongue is connected to the primary collar and extends forward from the primary collar. A hitch assembly component is attached to the hitch tongue forward end. A primary mast includes a primary front vertical member with a front member lower end fixed to the primary collar and a primary rear vertical member with a rear member lower end fixed to the primary collar. A primary horizontal beam is fixed to the primary front vertical member upper end and to a primary rear vertical member upper end. A vertical height adjustment frame is slidably attached to the primary front vertical member and the primary rear vertical member of the primary mast. A linear actuator is connected to the primary collar and to the vertical height adjustment frame to slide the vertical height adjustment frame relative to the primary mast. A power unit frame is pivotally connected to the vertical height adjustment frame for pivotal movement about a generally vertical axis. A motor is mounted on the power unit frame. A tire and wheel and journaled on the power unit frame for rotation about a generally horizontal axis. The motor drives the tire and wheel. A steering assembly, connected to the power unit frame, pivots the power unit frame about the generally vertical axis relative to the vertical height adjustment frame.

The vertical height adjustment frame includes a ring member that is smaller than the primary collar and can pass through the primary collar. The vertical height adjustment frame includes a secondary mast with a secondary front vertical member connected to the ring member and a secondary rear vertical member connected to the ring member. A secondary top horizontal bar is connected to the secondary front vertical member and to the secondary rear vertical member. The power unit frame is pivotally connected to the secondary top horizontal bar.

BRIEF DESCRIPTION OF THE DRAWINGS

These and other objects, features and advantages will become more readily apparent in view of the following detailed description and best mode, appended claims and accompanying drawings, in which:

DETAILED DESCRIPTION OF THE PREFERRED EMBODIMENT

Figure 1:
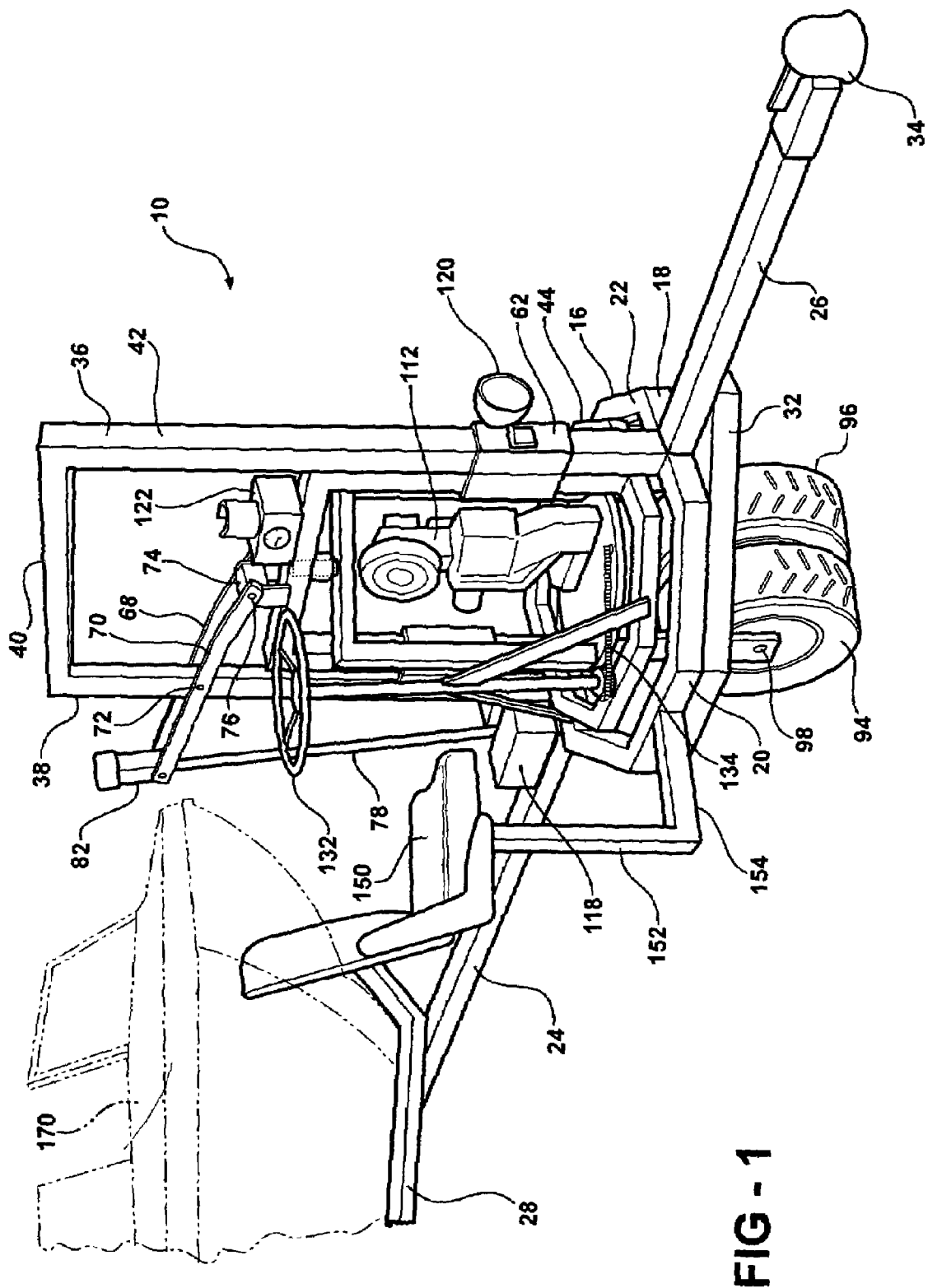
FIG. 1 is a perspective view of the boat trailer tug, with parts broken away.

The terms left, right, front and rear are relative to a person standing at the rear of the boat trailer and facing in the normal direction of forward movement.

The boat trailer tug 10 includes a tug primary assembly frame 12, a vertical height adjustment frame 14, and a power unit frame assembly 84. The primary frame assembly 12 includes a primary collar 16. The collar 16 includes eight pipes 18 welded together to form an eight-sided ring that is a regular octagon with equal length sides 20. The top surface 22 of each side 20 is positioned in a generally horizontal plane. A mounting beam 24 is attached to the collar 16 and extends horizontal rearward. A secondary hitch tongue 26 is attached to the front of the collar 16. The mounting beam 24 and the hitch tongue 26 are square steel tubes with the long axis of the tongue coaxial with a long axis of the mounting beam. However, the shape of the mounting beam 24 can be modified to accommodate a boat trailer 28 to which the beam is attached if modification is required or desirable. Reinforcing members 30 and 32, under the right side of the collar 16, reinforce the connection between the mounting beam 24, the hitch tongue 26 and the collar. Reinforcing members similar to members 30 and 32 are also attached to the bottom of collar 16 to the left-hand side of the tug 10 to further reinforce the connections between the collar, the mounting beam 24 and the hitch tongue 26. A ball socket 34 of a ball and socket hitch is secured to the forward end of the hitch tongue 26.

A front vertical tube 36 extends upward from the top surface 22 at the front of the collar 16. A rear vertical tube 38 extends upward from the top surface 22 of the rear of the collar 16. A horizontal beam 40 is attached to the upper end of the vertical tube 38 and to the upper end of the vertical tube 36. A horizontal beam 40 in combination with a vertical tubes 36 and 38 form a primary mast 42.

The height adjustment frame assembly 14 includes an octagon shaped ring 44 that is slightly smaller in width and length than collar 16 and can pass through the center of the collar. A front vertical tube 46 is secured to the top surface 48 of the front horizontal bar 50 of the octagon shaped ring 44. A rear vertical tube 52 is secured to the top surface 48 of the rear horizontal bar 54 of the ring 44. A top horizontal bar 56 is secured to the top of the front of the vertical tube 46 and the top of the rear vertical tube 52.

A front inboard sleeve 58 is telescopically received on the front vertical tube 46. A rear inboard sleeve 60 is telescopically received on the rear vertical tube 52. Both inboard sleeves 58 and 60 are preferably fixed to the front vertical tube 46 and the rear vertical tube 52 of the vertical height adjustment frame 14. An outboard sleeve 62 is integral with the inboard sleeve 58 and is telescopically received on the front vertical tube 36 of the primary frame assembly 12. An outboard sleeve 64 is integral with the inboard sleeve 60 and is telescopically received on the rear vertical tube 38 of the primary frame assembly 12. A bell crank assembly 66 with a left bell crank arm 68 and a right bell crank arm 70 is pivotally attached to the rear vertical tube 38 by bell crank pivot pin 72. First ends of the bell crank arms 68 and 70 are attached to a bearing that rolls in the block assembly 74, on the top horizontal bar 56 of the height adjustment frame 14, by a pivot pin 76. A linear actuator 78 is pivotally attached to the second ends of the bell crank arms 68 and 70 by an upper pivot pin 80. A lower end of the linear actuator 78 is pivotally attached to the mounting beam 24 by pivot pin 80. Extending the linear actuators 78 will move the height adjustment frame 14 downward relative to the primary frame 12. Retracting the linear actuator 78 will move the height adjustment frame 14 upward relative to the primary frame 12. The linear actuator 78 shown on the drawing is a screw-type unit driven by a reversible electric motor 82. The linear actuator 78 could also be a manually operated screw or a hydraulic cylinder.

The power unit frame assembly 84 includes a circular base plate 86. A forked member 88, fixed to the base plate 86, has two depending arms 90 and 92. A pair of tires and wheels 94 and 96 are clamped to a hub 100 journaled on a spindle 98 connected to the arms 90 and 92. A pair of spaced apart vertical tubes 102 and 104 have their lower ends fixed to the top of the base plate 86 adjacent to an outer periphery of the plate and on opposite sides of the plate from each other. A horizontal bar 106 is fixed to the upper ends of vertical tubes 102 and 104. A trunnion 108 extends vertically upward from the center of the bar 106. The trunnion 108 is received in a bearing housing 110 and is retained in the bearing. The bearing housing 110 is attached to the top horizontal bar 56, of the height adjustment frame assembly 14, and extends vertically downward from the top horizontal bar.

An internal combustion engine 112 is mounted on the base plate 86. The engine 112 is connected to and drives a multi-ratio transmission 114 with a reverse gear. Power is transmitted from the engine 112 through a centrifugal force actuated clutch, to the transmission 114 and to the hub 100 and wheels 94 and 96 by a chain and sprockets enclosed in a housing 116. The centrifugal clutch, transmission 114 and chain and sprockets can be replaced by a hydraulic pump connected to the engine 112. Hydraulic fluid under pressure from the pump is supplied to a reversible hydraulic motor connected to the hub 100 and the wheels 94 and 96. The internal combustion engine 112 is preferably an air cooled engine similar to the engines used on garden tractors, motorcycles and all-terrain vehicles. An electric starter and generator are provided with the engine 112. Batteries in battery boxes 118 are charged by the generator and supply electric current to the starter. Current is also supplied to lights 120, to the linear actuator 78, and to trailer lights (not shown).

An instrument panel 122 with light switches, an engine ignition switch, a starter switch, and a control switch for the linear actuator 78, is mounted on the top horizontal bar 56 of the height adjustment frame assembly 14.

A steering system includes a steering shaft tube 124 fixed to bars 126 and 128 that are fixed to the octagon shaped ring 44 of the height adjustment frame assembly 14. A steering shaft and drive sprocket 130 is journaled in the steering shaft tube 124. A steering wheel 132 is attached to the upper end of the steering shaft and drive sprocket 130. A steering drive chain 134 has its ends anchored to the circular base plate 86 and engages the sprocket 130. Chain guides 136, fixed to the base plate 86, are provided as required to guide the chain 134 to and from the sprocket 130. Rotating the steering wheel 132 pivots the entire power unit frame 84 about the vertical axis of the trunnion 108.

Figure 2:
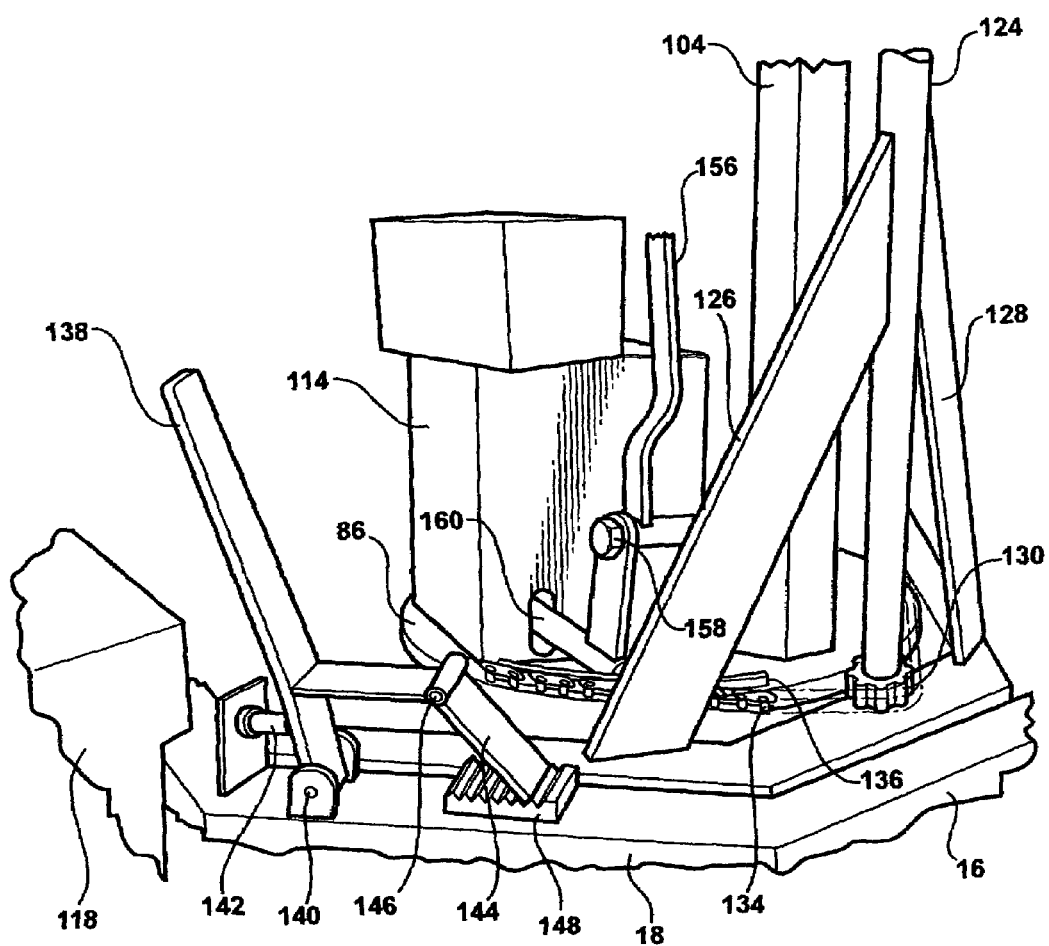
FIG. 2 is an enlarged perspective view of a portion of a tug, with parts broken away, showing the brake control and a portion of the steering system.
Figure 3:
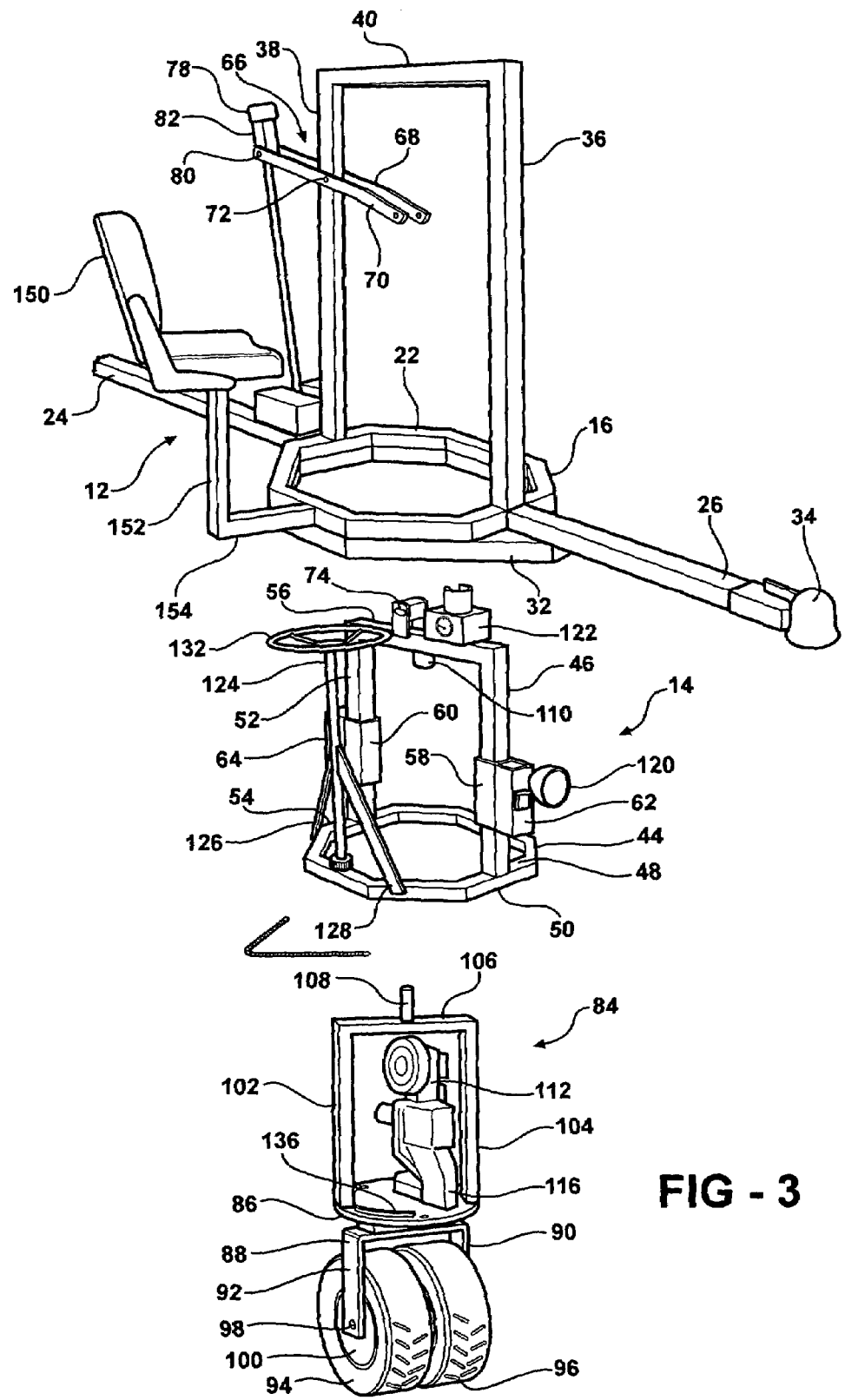
FIG. 3 is an expanded view of the boat trailer tug.

A brake pedal 138 is pivotally attached to the primary collar 16 by a pivot pin 140. Pressure applied to the pedal 138 to force the pedal counterclockwise about the pivot pin 140, as shown in FIG. 2, moves the actuator rod 142 of a brake master cylinder and forces hydraulic fluid into a brake cylinder that applies a brake. The brake cylinder is preferably mounted in a location in the drive gear train that provides a substantial mechanical advantage. A brake lock plate 144 is pivotally connected to the brake pedal 138 by a pivot pin 146. To lock the brake, the lock plate 144 is rotated about the pin 146 and into engagement with the rack 148. The brake pedal 138 is then pressed by foot to apply the brake. As the pedal 138 pivots about the pin 140, the lock plate 144 slides over the teeth of the rack 148. The teeth of the rack 148 prevent the brake from releasing when the operator's foot is removed from the pedal 138. To release the brake, the lock plate 144 is pivoted out of engagement with the rack 148.

An operator's seat 150 is mounted on tubes 152 and 154. The tubes 152 and 154 are attached to the collar 16. Seat position adjustment can be provided by adjusting the effective length of the tubes 152 and 154. A seat belt can be provided if desired.

A transmission shift lever 156 is pivotally attached to a tube 102 of the power unit frame 84 by a bolt 158. A transmission gear ratio selector 160 attached to the shift lever 156 extends into the multi-ratio transmission 114 and selects gear ratios in response to manual movement of the shift lever 156.

Figure 4A:
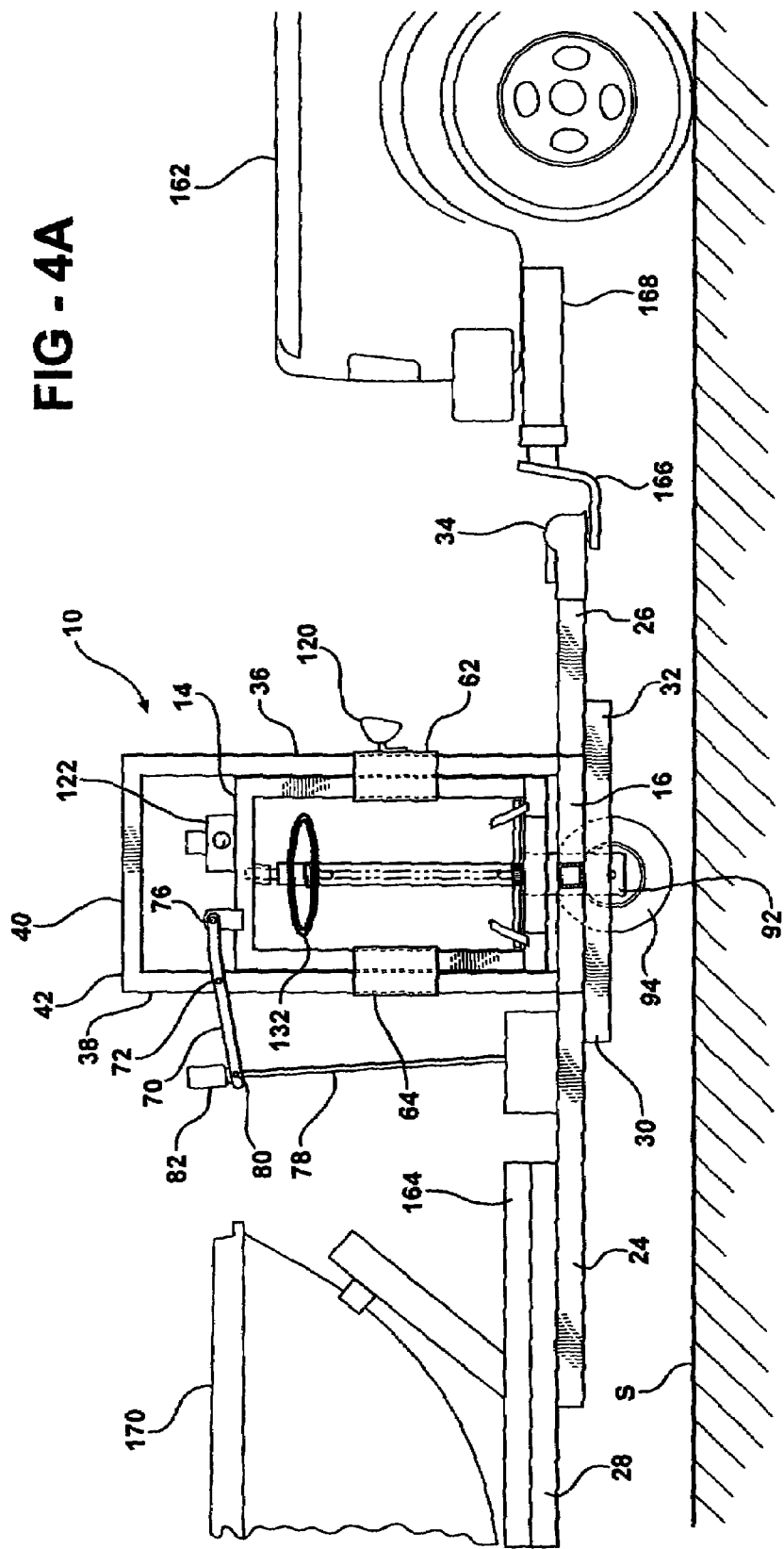
FIG. 4A is a side elevational view of the boat trailer tug in a raised transport position and with the trailer connected to a vehicle.

The boat trailer tug 10, as shown in FIG. 4A, is attached to a boat trailer 28 as well as to a towing vehicle 162. The mounting beam 24 of the boat trailer tug 10 is clamped to the hitch assembly or hitch frame 164 of the boat trailer 28. The attaching structure and the mounting beam 24 are modified as required to make the connection to the trailer 28. As shown, the mounting beam 24 is under the trailer hitch frame 164. The mounting beam 24 might attach to the top of the hitch frame 164 on other trailers 28. The mounting beam 24 may be attached to the trailer hitch frame 164 on some trailers by welding. Bolts may be used in some cases rather than welding. Various types of clamps may work well with other trailers. If the boat trailer 28 has a ball receiver on the trailer hitch frame 164, a hitch ball can be attached to the mounting beam 24 and received in the ball receiver. Clamps or bolts are employed in addition to the ball and socket hitch assembly. The ball socket 34 on the secondary hitch tongue 26 is attached to a ball hitch member 166. The ball hitch member 166 is secured to a receiver 168 that is attached to the frame of the vehicle 162. The height adjustment frame 14 has been raised relative to the primary collar 16 by the linear actuator 78 to lift the tires and wheels 94 and 96 clear of a road or ramp surface S as shown in FIG. 4A. A locking pin or other retainer may be employed to hold the height adjustment frame 14 in a raised position and to release the load on the linear actuator 78. With the tires and wheels 94 and 96 well above the road surface S, the boat trailer 28 and a boat 170 loaded on the trailer are ready to be pulled on a road by the vehicle 162.

Figure 4B:
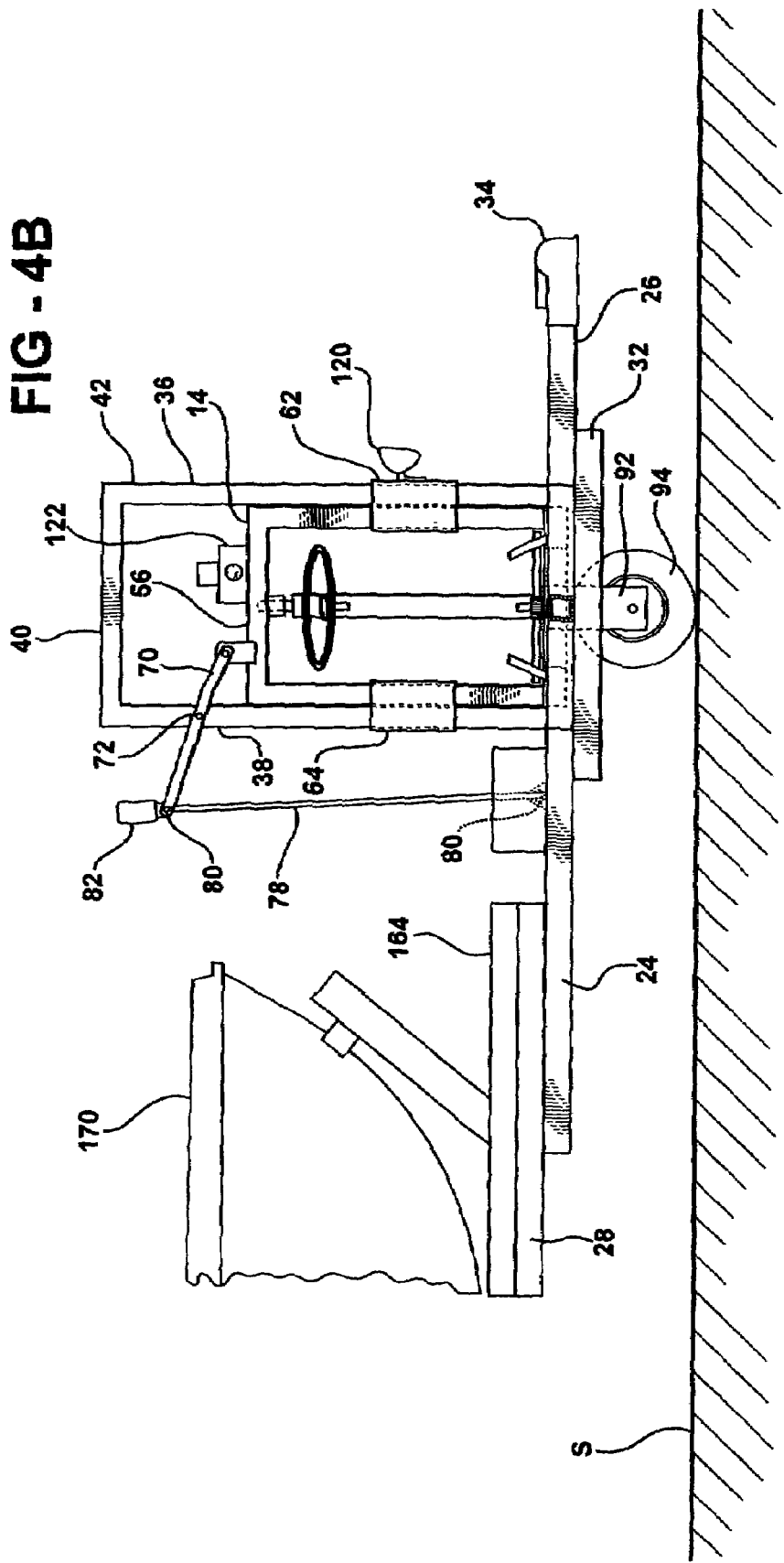
FIG. 4B is a side elevational view of the boat trailer tug in a lowered working position.

The boat trailer 28 is disconnected from the vehicle 162 by applying the brake with the brake pedal 138 and locking the brake pedal in a brake-applied position by pivoting the brake lock plate 144 into engagement with a rack 148. The ball socket 34 is then shifted from a release position by manipulating the ball retainer mechanism that is a part of the ball socket. The linear actuator 78 is then extended to lower the height adjustment frame 14 relative to the primary collar 16. The tires and wheels 94 and 96 are lowered to the surface S first. Continued extension of the linear actuator 78 lifts the primary collar 16, the secondary hitch tongue 26 and the ball socket 34 until the socket is above the ball of the ball hitch member 166. The boat trailer tug 10 is then free, as shown in FIG. 4B, to move the boat trailer 28 to a boat ramp, if the boat trailer lights have been disconnected from the electrical system of the vehicle 162. The tug 10 moves the trailer 28 down the ramp and into the water. The linear actuator 78 is extended or retracted as required to permit the boat 170 to float away from the trailer. After the boat 170 is launched, the boat trailer tug 10 pulls the boat trailer 28 to a boat trailer parking area. In the event that the boat 170 is to remain in the boat launch area for a period of time, the tug 10 can take the boat out of the water at night and any other time it is not being used. The tug 10 and the boat 170 can be taken to a campsite or any other nearby location and secured without hooking the trailer 28 to the vehicle 162.

I claim:

1. A boat trailer tug comprising:
    a primary collar, a mounting beam fixed to the primary collar, extending to the rear of the primary collar and connectable to a boat trailer, a hitch tongue connected to the primary collar and extending forward from the primary collar, and a hitch assembly component attached to a hitch tongue forward end;
    a primary mast including a primary front vertical member with a front member lower end fixed to the primary collar, a primary rear vertical member with a rear member lower end fixed to the primary collar, and a primary horizontal beam fixed to a primary front vertical member upper end and a primary rear vertical member upper end;
    a vertical height adjustment frame including a ring member that is smaller than the primary collar and can pass through the primary collar, a secondary front vertical member connected to the ring member, a secondary rear vertical member connected to the ring member and a second top horizontal bar connected to the secondary front vertical member and the secondary rear vertical member and slidably attached to the primary front vertical member and the primary rear vertical member of the primary mast;
    a linear actuator connected to the primary collar and to the vertical height adjustment frame to slide the vertical height adjustment frame relative to the primary mast;
    a power unit frame pivotally connected to the secondary top horizontal bar of the vertical height adjustment frame for pivotal movement about a generally vertical axis, a motor mounted on the power unit frame, at least one tire and wheel journaled on the power unit frame for rotation about a generally horizontal axis and driven by the motor; and
    a steering assembly connected to the power unit frame for pivoting the power unit frame about the generally vertical axis relative to the vertical height adjustment frame.

2. A boat trailer tug, as set forth in claim 1, wherein the linear actuator is connected to the vertical height adjustment frame through a bell crank that is pivotally attached to the primary mast.

3. A boat trailer tug, as set forth in claim 1, including an operator's seat mounted on the primary collar.

\* \* \* \* \*